United States Patent
Beldring et al.

(10) Patent No.: US 8,845,976 B2
(45) Date of Patent: Sep. 30, 2014

(54) APPARATUS FOR RAPID MIXING OF MEDIA AND METHOD

(75) Inventors: Finn Beldring, Virum (DK); Dragan Lukic, Kgs. Lyngby (DK); Troels Hilstrom, Herlev (DK)

(73) Assignee: Biogasol ApS (DK)

( * ) Notice: Subject to any disclaimer, the term of this patent is extended or adjusted under 35 U.S.C. 154(b) by 594 days.

(21) Appl. No.: 13/144,276

(22) PCT Filed: Jan. 12, 2010

(86) PCT No.: PCT/DK2010/050004
§ 371 (c)(1),
(2), (4) Date: Sep. 26, 2011

(87) PCT Pub. No.: WO2010/081477
PCT Pub. Date: Jul. 22, 2010

(65) Prior Publication Data
US 2012/0100045 A1    Apr. 26, 2012

(30) Foreign Application Priority Data

Jan. 13, 2009   (DK) ................................ 2009 00050

(51) Int. Cl.
| | | |
|---|---|---|
| *B01J 19/18* | (2006.01) | |
| *B01F 3/06* | (2006.01) | |
| *B01F 3/12* | (2006.01) | |
| *B01F 7/02* | (2006.01) | |
| *B01F 7/00* | (2006.01) | |
| *B01F 13/10* | (2006.01) | |
| *B01F 13/06* | (2006.01) | |
| *B01F 15/06* | (2006.01) | |
| *B01F 15/02* | (2006.01) | |

(52) U.S. Cl.
CPC ................... *B01F 3/06* (2013.01); *Y02E 50/16* (2013.01); *B01F 3/1221* (2013.01); *B01F 7/024* (2013.01); *B01F 7/00491* (2013.01); *B01F 7/00466* (2013.01); *B01F 7/007* (2013.01); *B01F 13/1044* (2013.01); *B01F 13/065* (2013.01); *B01F 15/063* (2013.01); *B01F 15/0251* (2013.01)
USPC ...................... 422/226; 366/150.1; 366/156.1

(58) Field of Classification Search
CPC ..................................... B01J 19/18; B01F 3/06
USPC ............................. 422/226; 366/150.1, 156.1
See application file for complete search history.

(56) References Cited

U.S. PATENT DOCUMENTS

| | | | |
|---|---|---|---|
| 3,913,894 A * | 10/1975 | McFarren | ..................... 366/76.3 |
| 4,303,470 A | 12/1981 | Meredith et al. | |
| 5,018,673 A | 5/1991 | Eirich et al. | |
| 5,590,961 A | 1/1997 | Rasmussen | |
| 6,033,103 A * | 3/2000 | Schuchardt | ..................... 366/97 |
| 2003/0209618 A1 | 11/2003 | Sneeringer et al. | |
| 2004/0124296 A1 | 7/2004 | Liu et al. | |
| 2006/0120212 A1 | 6/2006 | Taniguchi et al. | |

FOREIGN PATENT DOCUMENTS

| | | |
|---|---|---|
| EP | 0370181 A1 | 5/1990 |
| EP | 1847621 A1 | 10/2007 |
| WO | WO-2008/080366 A1 | 7/2008 |

OTHER PUBLICATIONS

"International Application Serial No. PCT/DK2010/05004, International Preliminary Report on Patentability mailed May 19, 2011", 33 pgs.

"International Application Serial No. PCT/DK2010/05004, International Search Report mailed Apr. 19, 2010", 5 pgs.

* cited by examiner

*Primary Examiner* — Walter D Griffin
*Assistant Examiner* — Huy-Tram Nguyen
(74) *Attorney, Agent, or Firm* — Schwegman Lundberg & Woessner, P.A.

(57) ABSTRACT

The present invention relates to an apparatus, which can be part of a pre-treatment system in a plant for the production of fuels, e.g. bio-ethanol, derived from plant biomass, e.g. first generation crops, such as grain, sugarcane and corn or second generation crops such as lignocellulosic biomass. The invention relates to an apparatus for processing, such as fluffing and mixing, at least two media, such as a solid, e.g. biomass, and a fluid, e.g. steam, so as to rendering the first medium susceptible to efficient receiving of energy and/or mass which is provided by localized release of the second medium. Although the description of the present invention focuses on biomass, it is envisaged that the invention is generally applicable to control the mixing of at least two media by crossing their stream of while dispersing at least one of them.

13 Claims, 6 Drawing Sheets

Fig 6

APPARATUS FOR RAPID MIXING OF MEDIA AND METHOD

RELATED APPLICATIONS

This application is a nationalization under 35 U.S.C. 371 of PCT/DK2010/050004, filed Jan. 12, 2010 and published as WO 2010/081477A1 on Jul. 22, 2010, which claimed priority under 35 U.S.C. 119 to Denmark Patent Application No. PA 2009 00050, filed Jan. 13, 2009; which applications and publication are incorporated herein by reference in their entirety.

FIELD OF THE INVENTION

The present invention relates to a process and apparatus for processing, such as fluffing and mixing, at least two media, such as a solid, e.g. biomass, and a fluid, e.g. steam, so as to rendering the first medium susceptible to efficient receiving of energy and/or mass which is provided by localized release of the second medium.

Although the description of the present invention focuses on biomass, it is envisaged that the invention is generally applicable to control the mixing of at least two media by crossing their stream while dispersing at least one of them.

BACKGROUND OF THE INVENTION

Among fuels derived from plant biomass, ethanol has received particular attention as a potential replacement for or supplement to oil-derived products.

Production of ethanol from biomass is normally obtained through the fermentation process of raw biological material rich in sugar or starch such as grain, sugarcane or corn also referred as first generation bio-ethanol.

To minimize the production cost and increase the potential of bio-ethanol produced from biomass, it is crucial to use lignocellulosic biomass in the form of low-cost byproducts from gardening, agriculture, forestry, timber industry and the like; thus for example, materials such as straw, maize stems, forestry waste, sawdust and wood-chips. Ethanol produced from this type of biomass is also referred to as second generation bio-ethanol.

Lignocellulosic biomass contains sugar polymers in form of hemicelluloses and cellulose. Before those sugars can be fermented to ethanol the sugar polymers has to be broken down to its sugar monomers. A common way to brake down the polymers is to use enzymatic hydrolysis. To increase the availability of the biomass to the enzymes the lignocellulosic biomass often undergoes a thermo/chemical pre-treatment. Following a thermochemical approach such a process often requires that the temperature of the biological matter is raised to a temperature being above the boiling temperature of the liquid in which the biological matter is contained. Therefore, one is often faced with the problem of pressurising a slurry or a pulp containing the biological matter so that the temperature can be increased to temperatures above the boiling temperature of the liquid while maintaining the fluid in a liquid state. When considering this problem within the preparation of biomass for fermentation, the temperature of the slurry or pulp containing the biological matter needs to be around 140-200° C. in order for the preparation process to be carried out and this is the question of producing sufficient activation energy within the material.

Another problem, that is particularly relevant in biomass, is the rate of change of the temperature of the slurry or pulp containing the biological matter. It has been found that the rate of change of the temperature should be as high as possible to reduce the time at elevated temperature to reduce the amount of unwanted chemical side reactions. Optimally, the time at elevated temperature should be reduced to only the time it takes for the desired reactions to take place at the desired temperature.

A particular relevant problem to be solved is to avoid overheating of the slurry or pulp containing the biological matter. Such overheating means that the slurry or pulp is heated to a temperature being above the desired temperature aimed at. Such overheating results in that unwanted side reactions may occur rendering the quality of the prepared slurry or pulp lower. Often the overheating is the result of locally applying heat to the slurry or pulp by e.g. a heating surface that is heated to a temperature above the desired reaction temperature in order to produce heat conduction through the slurry or pulp based on a temperature gradient. In other situation that tends to limit the overheating issue steam is often used to heat slurry or pulp and is introduced as steam into a reactor and the condensation of steam tends to limit heat transfer and overheating.

However, such introduction of steam requires long heating time as often the particles to be heated tend to agglomerate and therefore if such agglomeration occurs the total volume of the agglomerated particles is increased less than the total surface of the agglomerated particles, i.e. the volume to surface ratio is reduced by agglomeration.

Furthermore, the transport of the heat into the particles is governed by the temperature gradient at the surface of the particles and it is therefore an aim to make this gradient as steep as possible.

As mass diffusion in principle is governed by the same measures the above considerations are also relevant for mass diffusion into particles.

Another problem, particularly relevant is that in many of the known processes, shredding/reducing to particles of the raw material is made by a process in which the energy consumed dissipates from the raw material to the surrounding. This is due to the fact that generally shredding/reducing to particles of the raw material is carried out upstream the heating process causing a relevant loss of the processing energy.

U.S. Pat. No. 5,590,961 describes a method of injecting a first fluid into a second fluid to provide a fast temperature increase of the second fluid avoiding destruction of the functional properties of the second fluid.

U.S. Pat. No. 4,303,470 discloses a process and apparatus for mixing chemical with a wood pulp. In one example the chemical is oxygen which is carried to the rotors of a mixer through pipes. In turn radial passages carry the oxygen to the outer manifold and to the pulp through a central passage of the rotor body. The use of the apparatus is limited to mixing chemical and wood pulp as no cutting, milling and grinding elements are present.

That being said, an overall issue to be solved is to reduce a coherent structure of raw-material into separated particles while producing at the same time and intimate contact between the particles and a medium in order to efficiently exchange energy and/or mass.

Often the temperature aimed at is above the boiling temperature of the medium introduced at atmospheric pressure and therefore the pressure needs to be elevated above the atmospheric pressure. Accordingly, an overall issue to be solved is to produce uniform particle size from an inhomogeneous material in an apparatus under pressure while at the same time producing an intimate contact between the produced particles and the medium to allow a chemical reaction, a temperature increase or a combination thereof.

Thus, until now the problem of efficient mixing two media reducing a coherent structure of a first medium into separated particles while producing at the same time and intimate contact between the particles and a second medium in order to efficiently exchange energy and/or mass has not yet been overcome effectively and the present invention seeks at least mitigating some of the problems related thereto.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide an apparatus for processing, such as fluffing and mixing, at least two media which simultaneously has the function of i) rendering the first medium susceptible to efficient receiving of energy and/or mass and ii) providing such energy or mass by localized release of a second medium into the first medium.

It is a further object of the present invention to provide an advantageous alternative to the prior art by providing a processing apparatus in which the fluffing and mixing are carried out at a pressure higher than the atmospheric pressure.

The apparatus described can be part of a pre-treatment system in a plant for the production of bio-ethanol. The apparatus may receive biomass previously reduced to pulp or slurry by a pre-processing system which includes means for comminuting, soaking biomass, i.e. producing a pulp. Comminution is used herein to denote the process of reducing to small pieces or particles.

Before being fed to the apparatus said biomass may be dewatered to reduce its water content and therefore obtaining a more efficient processing. This dewatering process may be carried out at a pressure higher than or equal to the pressure inside the apparatus, so as to create a plug flow condition and avoiding back flash problem, i.e. forced material like very hot steam, ammonia, or in general chemicals and other gaseous mixtures out of the apparatus upstream in the bio-ethanol plant.

The apparatus therefore may receive a continuous feed of biomass at a pressure which is higher than or equal to the pressure inside the apparatus.

Although the description of the present invention focuses on biomass, it is envisaged that the invention is generally applicable to control the processing of at least two media by crossing their streams while dispersing at least one of them.

This object and several other objects are achieved by providing, in a first aspect of the invention an apparatus for processing at least two media, the processing comprising fluffing and mixing, the apparatus comprising: i) a casing having at least one inlet for a first medium, ii) rotating means inside the casing, said rotating means comprising protrusions and generating mixing zones while being rotated, iii) at least one inlet for feeding a second medium to said mixing zones, iv) at least one outlet for said first medium after being mixed with said second medium; wherein said inlet for said first medium is adapted to advance the first medium towards the rotating means in a direction being parallel to or substantial parallel to a radius of the rotating means.

Mixing zone is herein defined as the area between the rotating means and the internal wall of the casing.

Advancing the first medium towards the rotating means in direction being parallel to or substantial parallel to their radius provides a shredding effect which is advantageous as it leads to a better and more efficient comminution, fluffing and dispersion of the medium.

Advancing the first medium towards the rotating means is performed in fluid tight condition giving also the further advantage of providing a downstream and more efficient heat isolation of the reactor.

Examples of rotating means are, rotors, rotating disk, rotating cylinders with protrusions like cutting blades.

As indicated, more than two media may be introduced. For instance three media like biomass, hot gas such as steam and an oxidizing agent such as oxygen gas or ozone may be introduced into the apparatus. In this case the media may be introduced combined singularly, simultaneously or sequentially.

In one embodiment the introduction of oxygen is separated from the introduction of steam, e.g. oxidation is carried out downstream in a separated chamber, which is isolated by a lid from the chamber where stream is introduced. This embodiment may have the advantage of allowing heat transfer between the steam and the biomass avoiding any influence due to the following oxidization process. The lid has the function of allowing feeding between the chambers avoiding interference between the two processes of heat transfer and oxidation. In one embodiment the apparatus according to first aspect of the invention is adapted to operate with a material with a dry solid content between 0 and 100 percent as first medium.

The biomass received by the apparatus may have the consistency of a pulp, sludge, slurry, or dewatered solid such as dewatered biomass.

Pulp is herein used to denote a mixture of biomass in a liquid medium, usually water. Slurry is used to denote a suspension of insoluble biomass particles usually in water. The dry solid content depends on the efficiency of the previous dewatering process and on the nature, comminution, amount, particle size and distribution of the biomass introduced.

In a further embodiment the apparatus according to the invention further comprises pressurization means for pressurising said first medium so that said first medium when inside said inlet for said first medium is pressurized. The apparatus therefore may receive a feed of pressurized biomass which provides a fluid tight sealing of the apparatus.

In another embodiment in the apparatus according to the invention the pressurization means provide(s) a pressure inside the inlet for said first medium higher than or at least equal to the pressure inside the casing.

Feeding into the apparatus of a pressurized biomass at a pressure which is higher than or equal to the pressure inside the apparatus gives several advantages. In particular it provides security against damages to the system caused by back flash problem, i.e. forced material like very hot steam, ammonia, or in general chemicals and other gaseous mixtures out of the apparatus and upstream in the system.

In another embodiment in the apparatus according to the invention the pressurization means is or comprise a screw press.

In this case transportation, dewatering and compacting of the biomass are carried out at the same time before the introduction into the apparatus by, for example, a screw press. The screw feed is constructed so that the biomass in the form of pulp is dewatered and compacted during its transportation towards the inlet of the first medium with the aim of producing a plug that is intended to achieve a fluid tight seal of the apparatus. Therefore the first medium enters the apparatus in the form of a compacted pulp. The compacting and dewatering of the material is also advantageous as the efficiency of heat exchange in the material is highly dependent on its water content.

In a preferred embodiment the apparatus according to the invention further comprises pressurization means for providing a pressure inside the casing above the atmospheric pressure.

The pressure inside the casing can be provided by one or more pumps. For example the pressure may be provided by a pump, such as air compressor which keeps the pressure inside the casing at a desired value in order to perform the processing of the biomass, value which normally is above the atmospheric pressure.

In a further embodiment the apparatus according to the invention is adapted to operate with heated gas such as steam as second medium.

Steam is used to denote the water vapour as the gas phase of water.

Immediate condensation of the steam when in contact with the comminuted, fluffed and dispersed biomass promotes efficient and rapid heat exchange between the steam and the biomass.

Rapid heating is particularly advantageous to reduce the amount of unwanted chemical side reactions. The rate of change of the temperature between ambient temperature and desired temperature of a slurry or pulp containing biological matter needs to be as high as possible to reduce the time at elevated temperature. Optimally, the time at elevated temperature should be reduced to only the time it takes for the desired reactions to take place at the desired temperature.

Elevated temperature is used to denote a temperature above a certain base line temperature in which the biological matter is not active, i.e. is not subject to chemical/physical processes such as processes considered as degradation processes in bio-ethanol production plant.

The use of steam also solves the problem related to an efficient heat exchange between the material and the medium. Heat transport is highly depended on the water content of the material meaning that high water content tends to favour a fast conduction of heat internally in the material whereas low water content tends to limit the conduction of heat internally in the material. On the other hand, high water content will produce an inefficient heat transfer as most of the heat will be used to raise the temperature of the water contained in the material. By using steam onto particulate material with a low content of water an efficient heat transfer can be achieved.

In one embodiment the apparatus according to the first aspect of the invention is adapted to operate with a chemical agent as second medium.

A chemical agent may be, e.g. ammonia or acid in liquid or vapour form, which may be introduced to induce a reaction on the freshly activated surfaces of the first medium, such as biomass material.

The apparatus therefore may operate as a chemical reactor where freshly activated surfaces of a first medium are produced, i.e. by fluffing, comminuting and dispersing and a second medium, e.g. a chemical reagent, is introduced turning the media processing into a highly efficient reaction process.

In another embodiment the apparatus according the first aspect of the invention is adapted to operate with an oxidizing agent as second medium.

An oxidising agent may be oxygen gas which introduced into the apparatus, produces oxidation of the first medium, such as biomass material.

The mentioned second media may also be introduced combined singularly, simultaneously or sequentially in order to be mixed with the first medium.

In another embodiment the apparatus according the first aspect of the invention further comprises dosing means for dosing said second medium into said mixing zones.

The second medium release can be controlled by dosing means, such as a pump so to optimize the amount and the correct time of release of the second medium.

In an embodiment the apparatus according to the first aspect of the invention further comprises channels located into said rotating means for dosing/injecting said second medium into said mixing zones.

The apparatus has the advantage of producing freshly activated surfaces of a first medium by fluffing, comminuting and dispersing and therefore the introduction of a second medium through these channels located into the rotating means at the time and point of activation of the surfaces has the advantage of improving the processing efficiency. These channels may have different shape and size and may be or comprise a number of tubular channels at substantially mutually equidistant position.

When heated gas such as steam is used as second medium, the injection into the mixing zone in intimate contact with the first medium may be advantageous for solving the problem of overheating of the first medium. Often the overheating is the result of locally heating the surface of the first medium at a temperature above the desired temperature to compensate for the temperature gradient which will develop along the first medium. Heating of particulate first medium, which contains particles with high surface and low volume, through localized condensation of steam provides a homogeneous heating of the medium avoiding the overheating of the surfaces.

In some embodiments the rotating means comprise elements adapted to provide a pressure drop of the second medium introduced into the mixing zones, such as to provide a flash steam conditions.

'Flash steam' is released when, following condensation around the processing elements such as cutting, milling and grinding elements, a pressure drop occurs.

In other embodiments channels of the apparatus according to one embodiment are adapted to dose/inject said second medium at the end of said protrusions closer to the centre of said rotating means.

The rotating means may be or comprise disc shape elements.

The disc shape elements may be stacked in order to provide a rotating cylinder as rotating means.

In another embodiment of the apparatus according to the first aspect of the invention said rotating means is or comprise a rotating cylinder.

Through the control of the rotating speed and the number of protrusions of the rotating means and the velocity of advancing the first medium towards the rotating means the depth of cutting of the first medium can be defined and therefore the chips and particles size of the first medium can be adjusted to a desired value.

In one embodiment an apparatus according to the first aspect of the invention, said rotating means is or comprise a series of stacked discs and spacers.

In some other embodiments according to this previous embodiment said discs and spacers further comprise built in radial channels.

In a further embodiment of the apparatus according to the first aspect of the invention said rotating means comprise a plurality of protrusions generating unsteady fluctuating velocity distribution, such as vortex dominated flow of the media.

Turbulent flow generated by rotating disc protrusions appropriately designed, may improve the efficiency of processing of the media by increasing the mixing between the first medium, such as pulp and the second medium, such as a liquid agent.

Vortex is used herein to denote a spinning, turbulent, flow of fluid/gas. Generally the motion of the fluid swirls rapidly around a centre. The speed and rate of rotation of the fluid are greatest at the centre, and decrease progressively with distance from the centre.

In other embodiments the protrusions of the rotating elements comprise processing elements such as cutting, milling and grinding elements.

In one embodiment the apparatus according to the invention is adapted to provide an advancement of said first medium in said inlet between 10 nm and 30 mm per revolution of the rotating means.

The advancement of the first medium, also referred as radial in feed may be carried out at a determined rate in order to optimize the overall speed of the process.

In another embodiment of the apparatus according to the first aspect of the invention said rotating means is or comprise transporting means.

Rotating means may also provide transport of the first medium or of the mixture of the first and second medium through the apparatus from the inlet of the first medium the outlet of the processed material.

The object of the invention and several other objects are intended to be obtained in a second aspect of the invention by providing a system for producing bio-products from biomass, the system comprising: i) a pre-processing subsystem for collecting, transporting, reducing to pulp, comminuting and delivering the material to a processing apparatus, ii) a processing apparatus according to the first aspect of the invention, iii) a reactor chamber for changing chemical and/or physical structure, of said material.

In an embodiment the object of the invention and several other objects are intended to be obtained by providing a system for producing bio-ethanol according the second aspect of the invention.

The invention relates in a third aspect to a method being adapted to enable processing of at least two media utilizing a processing apparatus according to the first and the second aspect of the invention.

The invention further relates to a method for processing at least two media utilizing a processing apparatus according the first and the second aspect of the invention, wherein operating of said apparatus comprises injection/dosing of said second medium into said mixing zone while said first medium is being comminuted.

The invention further relates to a method utilizing a processing apparatus according to the first aspect of the invention wherein, when said apparatus for processing is adapted to operate with heated gas such as steam as second medium, operating of said apparatus produces heat transfer between said heated gas and said first medium.

Heat diffusion between steam and the first medium, such as biomass pulp produce a rapid temperature increase in the first medium.

The invention also relates to a method for mixing at least two media by means of localized injection of at least one medium into a second medium while said second medium is being processed to achieve an intimate contact between the media.

An advantage of this method may be the possibility of avoiding energy loss as the injection of a second medium, such as steam occurs while the mechanical processing of the first medium, such as biomass is taking place. In this way the added mechanical energy is preserved and included in the processing without heating losses and a potential second-heating can be reduced. In some embodiments such second-heating is not necessary and a cooling step of the biomass may be introduced.

The invention also relates to a method for opening structures of organic materials, such as lignocellulose based materials.

The first and second aspect of the present invention may each be combined with any of the other aspects. These and other aspects of the invention will be apparent from and elucidated with reference to the embodiments described hereinafter.

In the present context a number of terms are used in a manner being ordinary to a skilled person. However, in order to specify features comprised in some of terms a general definition on some of the terms are presented below.

BRIEF DESCRIPTION OF THE FIGURES

The apparatus according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Figure 1:
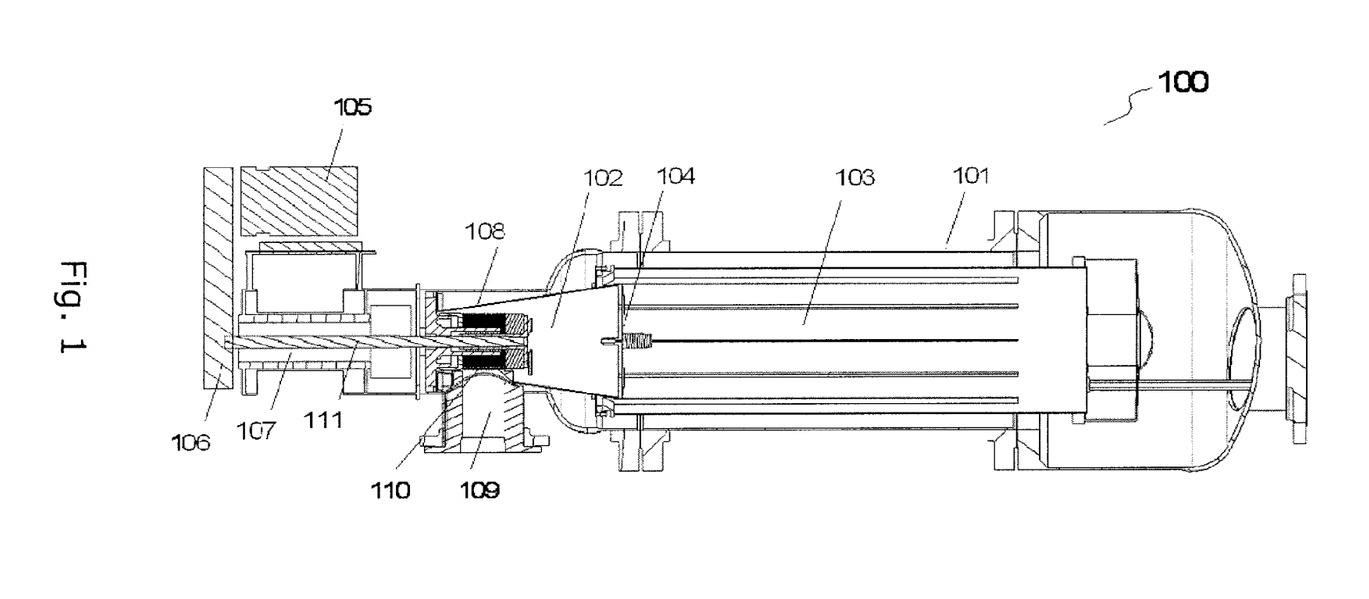
FIG. 1 shows a schematic representation of an axial cross sectional view of a device comprising the apparatus according to the invention including motor, gear and bearing located outside the apparatus.

FIG. 1 shows a schematic representation of an axial cross sectional view of a device 100 for processing two media, e.g. a solid, such as pulp and a liquid, such as water or a gas, such as steam. The device comprises a housing 101, such as a cylindrical vessel comprising the apparatus according to the invention, here referred as first reaction chamber 102 and a second reaction chamber 103. The two chambers are connected by means of a lid 104.

The orientation of the device 100 is shown in FIG. 1 as perpendicular to action of gravity. In another embodiment the device can be oriented to be parallel to the action of gravity. In this latter case the influence of the action of gravity to the motion of the media is further enhanced.

The device may be under pressure with the advantage of allowing the use of steam. However other gases or fluids may be used in the device under pressure. The device may also advantageously operate using super-heated steam. Superheated steam is herein defined as steam at a temperature higher than its saturation temperature, i.e. boiling point. The saturation temperature is the temperature for a corresponding saturation pressure at which a liquid boils into its vapor phase. To increase the temperature of the steam higher then its saturated temperature at atmospheric pressure, the pressure in the device is raised to values higher than the atmospheric pressure. The steam is then described as super-heated by the number of temperature degrees through which it has been heated above saturation temperature.

An external variable speed motor 108 including gear 106 and bearings 107 and rotating means 111 is also shown in FIG. 1.

The first reaction chamber 102 comprises a casing 108, an inlet for the material to be processed 109, a series of rotating elements 110 and a lid 104. The first reaction chamber casing 108 has a conical shape with the apex towards the motor and the base towards the second chamber 103. The conical shape facilitates the flow of the processed materials, such as pulp, towards the second reaction chamber 103 by means of gravity. The base of the conical casing is the lid 104 of the first reaction chamber 102 which allows materials flow between the first and the second reaction chamber 103. The lid allows continuous feeding to the second reaction chamber 103 and provides a barrier to the backstream of reagents present into the second reaction chamber 103. The lid 104 therefore delimits the area of the first reaction chamber 102 and avoids mixture between the first reaction chamber environment and the emission from the following reaction processes which might occur in the second reaction chamber 103.

The rotating elements 110, which are connected via a rotating means 111 to the variable speed motor 105 have the functions of i) providing comminution, dispersion and fluffing of the material introduced through inlet 109 and ii) exposing said material to a medium to allow rapid interaction, such as mixing/reacting, between the material and the medium. Such exposure can be carried at the time of the comminution, dispersion and fluffing or subsequently to the mechanical interaction between the material introduced and the rotating elements. The material during or after the mechanical interaction with the rotating elements may be exposed to one or more medium simultaneously or sequentially.

The second reaction chamber allows 103 for further chemical or physical treatment of the material, such as pulp, for example oxidation induced by an oxidizing environment, e.g. by the presence of oxygen gas.

Figure 2:
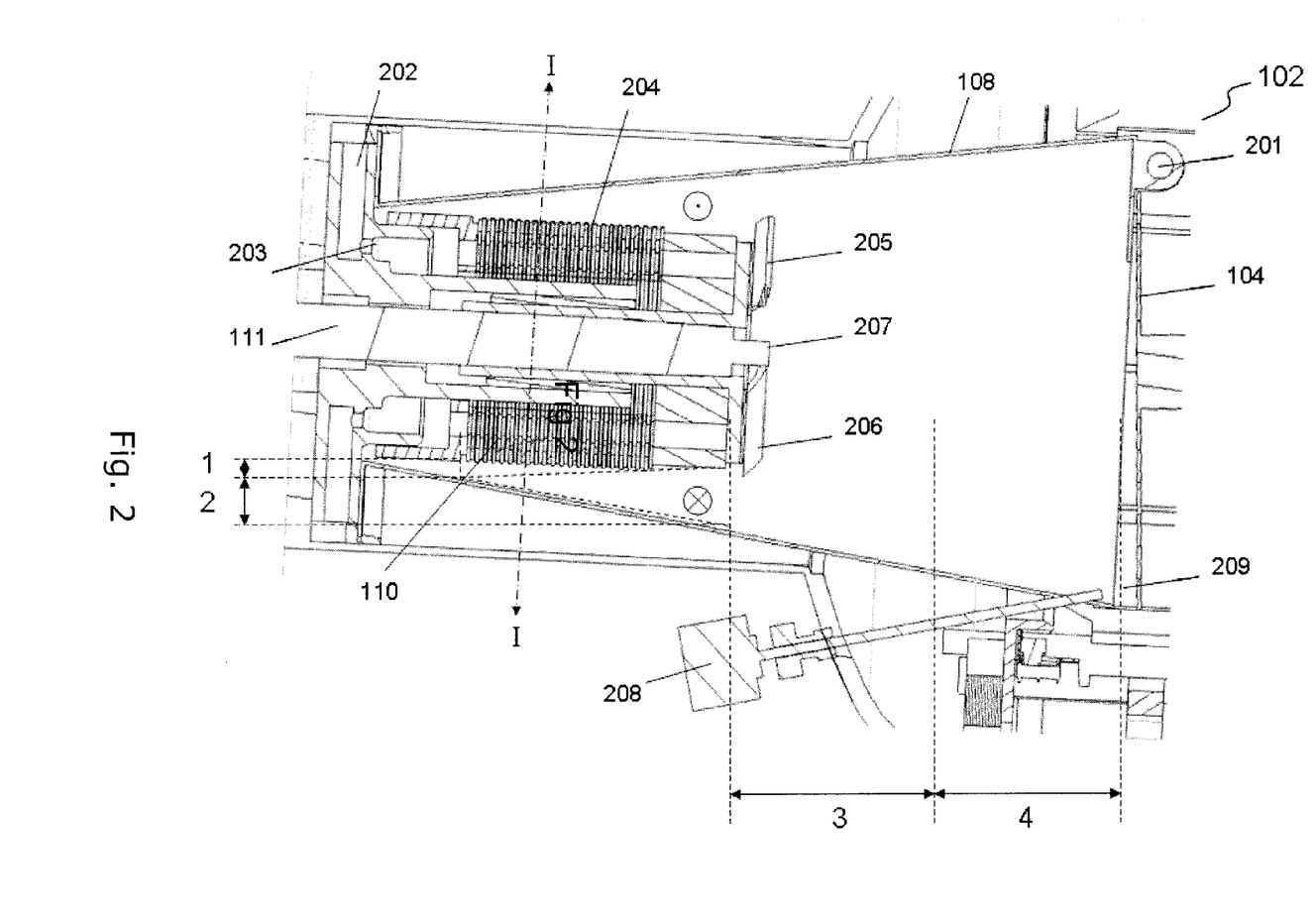
FIG. 2 shows a partial enlarged cross sectional view of the preferred embodiment of the apparatus according to the invention where 4 zones are identified on the basis of the dominating transport process, including a regular flow dominated zone, a turbulent flow dominated zone, a vortex dominated zone, a gravity dominated zone.

The cross sectional view in FIG. 2 shows the apparatus according to the invention, i.e. the reaction chamber 102, corresponding to the first reaction chamber 102 of FIG. 1, comprising a casing 108, an inlet (not shown) for the material to be processed parallel o substantially parallel to a radius of the rotating means 111, a series of rotating elements 110 and a lid 104. The reaction chamber casing 108 has a conical shape with the apex directed towards the motor (not shown) and the base formed by the lid 104. The conical shape facilitates the flow of the materials, which in this embodiment will be referred as pulp, towards the lid 104 by means of gravity. The lid 104 allows flow of pulp out of the reactor chamber by mechanical opening 201.

In the embodiment shown the rotating elements 110 are rotating discs fasten onto a rotating means, such as a drive shaft and being connected with a motor (not shown) located outside the casing 108.

The rotating discs are designed in order to provide comminution, dispersion and fluffing of the pulp introduced and exposure of said material to a medium, i.e. gas or liquid, to produce a rapid interaction. The rotating discs are designed in order to optimize the medium release at the instant of comminution, dispersion and fluffing.

The medium enters the reaction chamber 102 through inlet 202 and via conduit 203 is injected through outlet 204 into the reaction chamber.

At the end 207 of the rotating means 111 functional elements may be added providing further functionality. In the embodiment shown, the elements 205 and 206 generate a vortex inducing mixture and transport of the pulp towards the lid 104. Alternatively a screw conveyer may be used and located at the end 207 of the rotating means.

Close to the base of the reaction chamber 102 a temperature transmitter 208 is located allowing the control of the temperature of the pulp at the outlet 209. Optionally a gas outlet may be located along the side walls of the reaction chamber.

In the reaction chamber 102 four zones can be identified based on the different dominating transport processes of the introduced material: a regular flow dominated zone 1, a turbulent flow dominated zone 2, a vortex dominated zone 3, a gravity dominated zone 4.

In zone 1 the pulp is exposed to a mechanical treatment such as comminution, dispersion and fluffing provided by the rotating discs 110.

In this zone 1 the transport of the pulp is induced by the mechanical treatment which the pulp is exposed to.

Injection of the medium through the conduit 204 located in the rotating discs 110 is advantageous in this zone as injection is provided in a zone where intimate contact between freshly comminuted, dispersed and fluffed pulp and the medium is produced.

In zone 2 the pulp comminuted, dispersed and fluffed at least partially, is further exposed to the contact with the medium released through the rotating discs 110 leading to further interaction between medium and pulp and the transport of the pulp mixed to the medium is dominated by turbulence flow regime.

In zone 2 a different medium than the one previously introduced in zone 1 maybe further injected. This allows for sequential treatment of the pulp, for example the pulp may be treated with steam in zone 1 and with a chemical, such as oxygen peroxide, in the zone 2 leading to optimal oxidation.

In this specific embodiment extra conduit located along the wall of the casing (not shown) are present to allow localized release of a medium.

Sequential treatment of the pulp can be also obtained by release of different media between the initial part of the rotating discs 110 and the terminal part of the rotating discs 110. The initial part of the rotating discs 110 is defined as the part which is closer to the inlet for the material to be processed, while the terminal part is defined as the closer to the outlet 209 of the processed material.

In the vortex dominated zone 3 the pulp introduced experiences a spinning, turbulent motion swirling rapidly around the axial direction of the rotating discs. The speed and rate of rotation are greatest at the centre, and decrease progressively with distance from the centre transporting the material towards the lid 104. In this zone the ratio between pulp and medium is in the order of 1:9.

In the gravity dominated zone 4, the vortex influence into the motion of the pulp slowly decreases and the pulp moves by means of gravity towards the lid 104 and the reactor chamber opening 209. Here the head of the temperature probe 208 is in contact with the surface of the pulp which falls down onto it as the influence of the vortex motion decreases. The temperature probe 208 provides information about pulps temperature raise through the reaction chamber.

Figure 3:
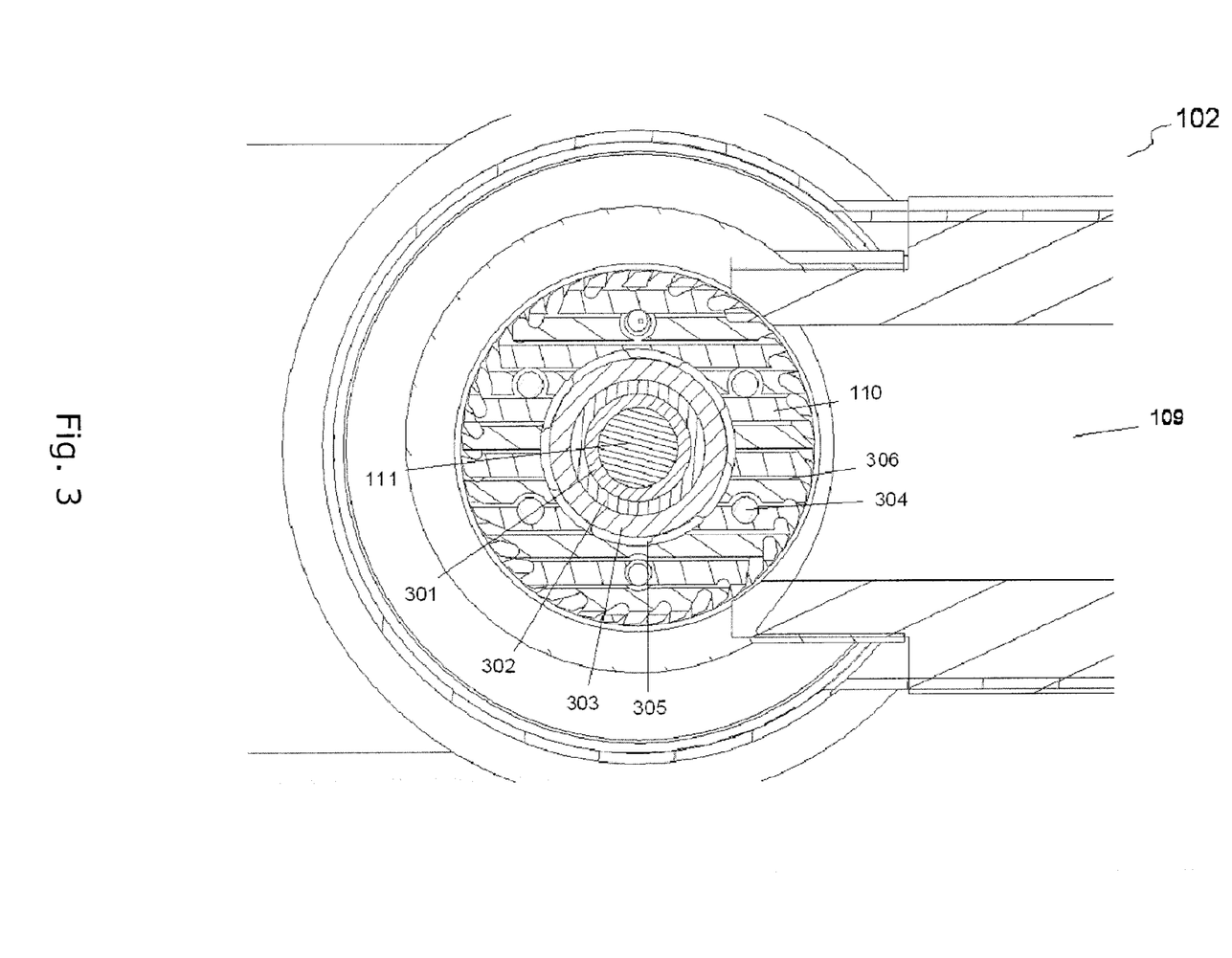
FIG. 3 shows an axial cross sectional view of the preferred embodiment of the invention along the line I-I in FIG. 2.

FIG. 3 shows an axial cross sectional view of the preferred embodiment of the invention along the line I-I in FIG. 2. In FIG. 3 the connection between the rotating discs 110 and the drive shaft 111 is shown including a rotating structure 301, bearings 302 and a static support structure 303. The rotating discs 110 are connected together through bolts located in the bolt holes 304.

The rotary velocity for the rotating disc may vary depending on the consistency, dry matter content, type, comminution, amount, particle size and distribution of the pulp and on the medium injected.

The pulp is introduced through conduit 109 while the medium is introduced in the rotating discs through the axial inlet 305 and driven by the rotation of the discs 110 injected into the reaction chamber through tubular conduit 306 present into the disc structure.

As a result of the rotor geometry the rotating discs, while rotating and therefore providing comminution, dispersion and fluffing of the pulp in small fibres, allow the injection of the medium into the pulp.

Owning to the radial displacement effect, the comminution and the dispersion effect of the rotating discs an instantaneous inclusion of the injected medium in the pulp is achieved.

In a preferred embodiment the medium is steam so that injection through the tubular conduits 306 in the rotating discs 110 and contact with the pulp lead to an almost instantaneous and effective heat transfer induced by the steam condensation. This allows an instantaneous temperature increase of the pulp avoiding denaturisation or burning. This fast temperature increase is mainly obtained combining the dispersion effect due to the rotating disc and the localized and immediate steam release through the tubular conduits present into the discs. In another embodiment the medium is a chemical reagent which is injected through the tubular conduits 306 while the pulp is comminuted, dispersed and fluffed by the rotating discs. This allows localized and immediate contact between the freshly dispersed and comminuted pulp and the chemical reagent causing a fast and efficient reaction between the two. Reaction time is therefore reduced since the chemical reagent is put in intimate contact with the pulp minimizing the diffusion time through the pulp.

Figure 4:
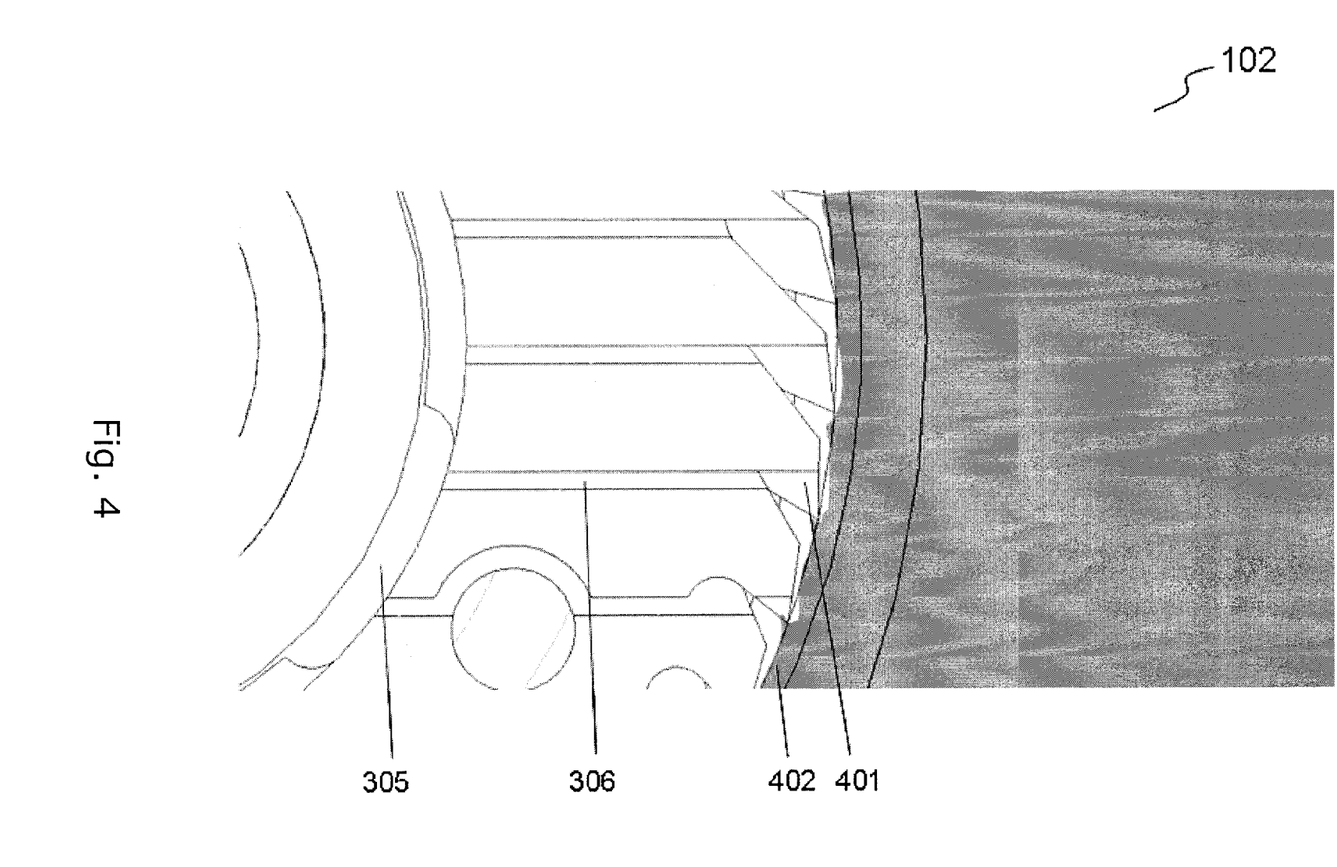
FIG. 4 shows a partial enlarged cross sectional view of the preferred embodiment along the line I-I in FIG. 2.

FIG. 4 shows in detail the structure of the rotating discs including the axial gas inlet 305, the tubular gas conduit 306 and the disc protrusions 401 of the rotating discs.

Efficient mixing between the medium and the pulp may also be obtained thanks to turbulent flow. The discs protrusions 401 may be designed in order to provide turbulence to increase the reactivity between the pulp and the medium.

A space, referred herein as a turbulence zone is formed between the periphery of the disc and the protrusions 401. This is where the most intense turbulence activity takes place. It should be understood, however that turbulence may occur, with less intensity in regions other than this space such as, e.g. in the regions 402 between the disc periphery and the sides walls of the reactor. Thus turbulence zone is used herein to refer to the region where the most intense turbulence takes place, and should not interpreted as turbulence cannot occur at some level in other regions of the reactor.

Figure 5:
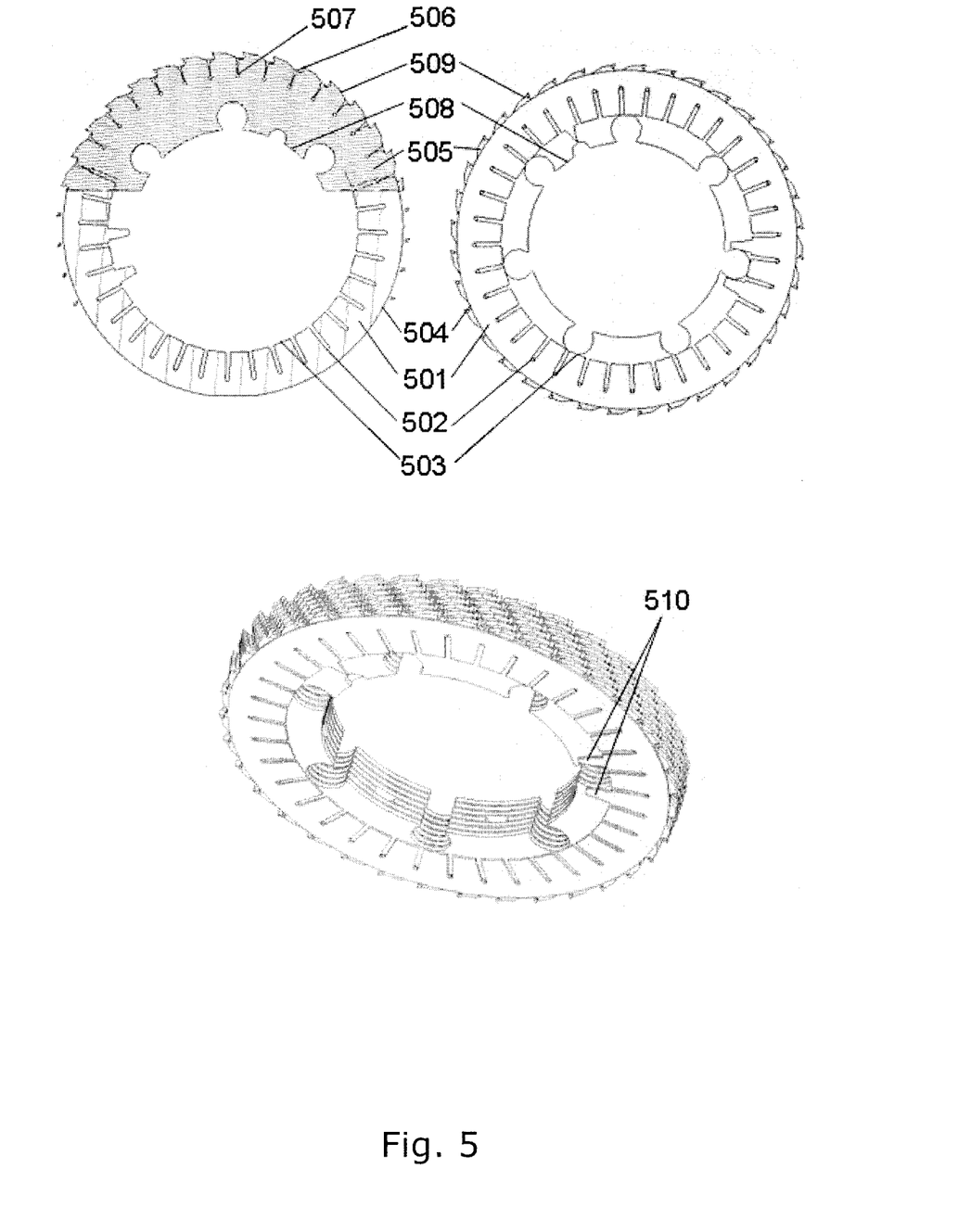
FIG. 5 shows a schematic representation of a front view of a disc and a spacer element (FIG. 5a) and a prospective view (FIG. 5b) of the stacks of rotating disc and spacer elements in a specific embodiment of the invention.

FIG. 5 shows a schematic representation of a front view of a disc and a spacer element (FIG. 5*a*) and a prospective view (FIG. 5*b*) of the stacks of rotating disc and spacer elements in a specific embodiment of the invention.

FIG. 5*a* shows a spacer 501 comprising a number of radially extending cut-outs 502. The cut-outs 502 of the spacer 501 initiating from the inner rim 503 towards—but not to the—outer rim 504. Similarly, the discs 505 comprising an equal number of radially extending cut-outs 506 initiating from a radial position 507 away from the inner rim 508 and to the outer rim 509 of the discs 505.

In FIG. 5*b* spacers such as 501 and discs such as 505 are stacked alternating to a spacer a discs and so on. Furthermore, the spacers 501 and discs 505 are stacked so that the ends of the cut-outs 502 of the spacer 501 are located below the beginning of the cut-outs 506 of the discs 505. Thereby, channels are formed which extend from the inner rim 503 of the spacer 501 to the outer rim 509 of the discs 505. These channels are used to introduce one or more media in the sense disclosed above.

In FIG. 5*b* aligning elements 510 are also shown.

In some embodiments the number of bolts which link the stacked spacer and discs may be a prime number.

Figure 6:
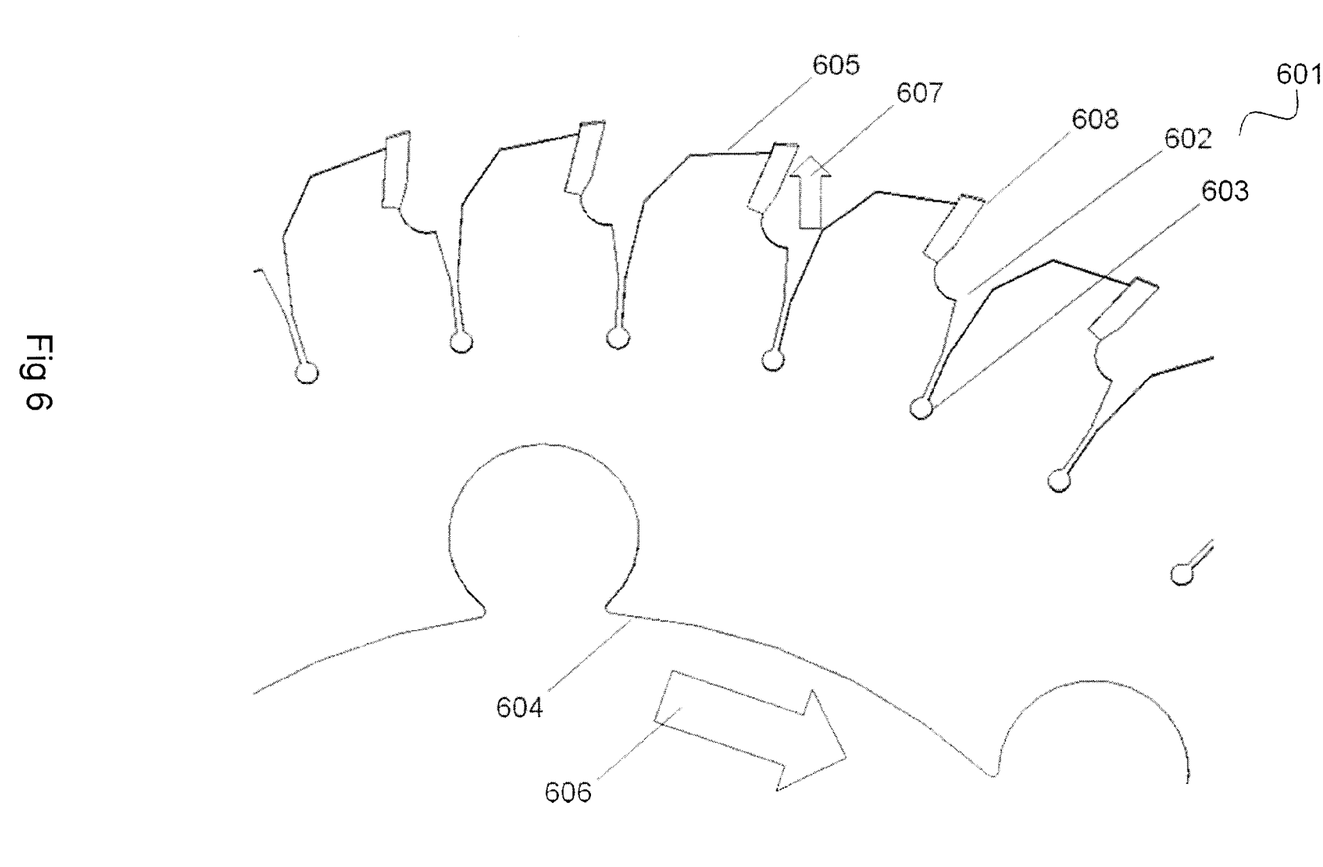
FIG. 6 shows a partial enlarged cross sectional view of a disc according to one of the embodiment of the invention.

FIG. 6 shows a partial enlarged cross sectional view of a disc according to one of the embodiment of the invention. Disc 601 comprises a number of radially extending cut-outs 602 initiating from a radial position 603 away from the inner rim 604 and to the outer rim 605 of the discs 601. When assembled for use discs such as 601 and spacer such as 501 in FIG. 5*a* are stacked alternating to a spacer a discs and so on similarly to FIG. 5*b*.

Upon rotation of the stacked spacer/disc assembly, following arrow 606 the one or more media as disclosed above are introduced and throught the channels shown in FIG. 4 reach the position 603. From 603 media are injected following arrow 607 into the apparatus while the pulp is comminuted, dispersed and fluffed by the rotating discs 601. This allows localized and immediate contact between the freshly comminuted pulp and the media causing a fast and efficient reaction between the pulp and media. In this embodiment the disc 601 is designed so as to provide a microject effect from the radial position 603 to the outer rim 605.

Furthermore the presence of a cutting edge 608 allows for a more efficient comminution of the pulp so that the pulp exposure to the media occurs on a freshly cut surface providing a fast and efficient intimate contant between the media and pulp. Reaction time is therefore reduced since the media is put in intimate contact with the pulp minimizing the diffusion time through the pulp.

The invention claimed is:

1. An apparatus for processing at least two media, the processing comprising fluffing and mixing, the apparatus comprising:
a casing having at least one inlet for a first medium,
rotating means inside the casing, said rotating means comprising protrusions, wherein said protrusions comprise processing elements, and said rotating means generating mixing zones while being rotated,
at least one inlet for feeding a second medium to said mixing zones,
channels being located in said rotating means for dosing/injecting said second medium into said mixing zones, at least one outlet for said first medium after being mixed with said second medium, wherein said inlet for said first medium is adapted to advance the first medium towards the rotating means in a direction being parallel to or substantially parallel to a radius of the rotating means, wherein:
said rotating means comprises a series of alternatingly stacked discs and spacers, in that each spacer comprises a number of radially extending cut-outs initiating at an inner rim and extending towards, but not to, an outer rim, in that each disc comprises a number of radially extending cutouts, said number being equal to the number of radially extending cut-outs of each spacer, initiating at a radial position and extending away from the inner rim and to the outer rim of the discs, and in that the spacers and discs are stacked so that the end of the cut-outs of the spacers are located below the beginning of the cut-outs of the discs, so that the channels are formed extending from the inner rim of the spacers to the outer rim of the discs.

2. An apparatus according to claim 1 further comprising pressurization means for pressurising said first medium so that said first medium when inside said inlet for said first medium is pressurized.

3. An apparatus according to claim 2 wherein said pressurization means provide(s) a pressure inside the inlet for said first medium higher than or at least equal to the pressure inside the casing.

4. An apparatus according to claim 2, wherein said pressurization means is or comprise a screw press.

5. An apparatus according to claim 1 further comprising pressurization means for providing a pressure inside the casing above the atmospheric pressure.

6. An apparatus according to claim 1, further comprising dosing means for dosing said second medium into said mixing zones.

7. An apparatus according to claim 1, wherein said channels are or comprise a number of tubular channels at substantially mutually equidistant position.

8. An apparatus according to claim 1, wherein said channels are adapted to dose/inject said second medium at the end of said protrusions closer to the centre of said rotating means.

9. An apparatus according to claim 1, adapted to provide an advancement of said first material in said inlet between 10 nm and 300 mm per revolution of the rotating means.

10. An apparatus according to claim 1, wherein said rotating means is or comprise transporting means.

11. A system for producing bio-products from bio-mass, the system comprising:
 i) a pre-processing subsystem for collecting, transporting, reducing to pulp, comminuting and delivering the material to a processing apparatus,
 ii) a processing apparatus according to the any of the preceding claims,
 iii) a reactor chamber for changing chemical and/or physical structure, of said material.

12. A system for producing bio-ethanol according to claim 11.

13. A method for processing at least two media, said method comprising:
comminuting a first medium in a mixing zone of a processing apparatus and at the same time dosing/injecting a second medium into said mixing zone, said processing apparatus comprising:
a casing having at least one inlet for a first medium,
rotating means inside the casing, said rotating means comprising protrusions, wherein said protrusions comprise processing elements, and said rotating means generating mixing zones while being rotated,
at least one inlet for feeding a second medium to said mixing zones,
channels being located in said rotating means for dosing/injecting said second medium into said mixing zones,
at least one outlet for said first medium after being mixed with said second medium,
wherein said inlet for said first medium is adapted to advance the first medium towards the rotating means in a direction being parallel to or substantially parallel to a radius of the rotating means, wherein:
said rotating means comprises a series of alternatingly stacked discs and spacers, in that each spacer comprises a number of radially extending cut-outs initiating at an inner rim and extending towards, but not to, an outer rim, in that each disc comprises a number of radially extending cutouts, said number being equal to the number of radially extending cut-outs of each spacer, initiating at a radial position and extending away from the inner rim and to the outer rim of the discs, and in that the spacers and discs are stacked so that the end of the cut-outs of the spacers are located below the be min of the cut-outs of the discs so that the channels are formed extending from the inner rim of the spacers to the outer rim of the discs.

* * * * *